(12) United States Patent
Tsengas et al.

(10) Patent No.: US 10,609,903 B1
(45) Date of Patent: Apr. 7, 2020

(54) STAND UP FOLD AWAY CLAW SCRATCHER

(71) Applicant: OurPet's Company, Fairport Harbor, OH (US)

(72) Inventors: Steven Tsengas, Fairport Harbor, OH (US); Konstantine S. Tsengas, Fairport Harbor, OH (US)

(73) Assignee: COSMIC PET LLC, Wichita, KS (US)

( * ) Notice: Subject to any disclaimer, the term of this patent is extended or adjusted under 35 U.S.C. 154(b) by 0 days.

(21) Appl. No.: 16/116,819

(22) Filed: Aug. 29, 2018

Related U.S. Application Data (63) Continuation of application No. 15/156,591, filed on May 17, 2016, now abandoned.

(51) Int. Cl.
*A01K 15/02* (2006.01)
*F16B 1/00* (2006.01)
*A44B 18/00* (2006.01)

(52) U.S. Cl.
CPC .......... *A01K 15/024* (2013.01); *A01K 15/025* (2013.01); *A44B 18/0011* (2013.01); *F16B 1/00* (2013.01); *F16B 2001/0028* (2013.01)

(58) Field of Classification Search
CPC ............................ A01K 15/024; A01K 15/025
USPC .......................................................... 119/706
See application file for complete search history.

(56) References Cited

U.S. PATENT DOCUMENTS

| | | | | | |
|---|---|---|---|---|---|
| 2,894,487 | A | * | 7/1959 | Goldson | A01K 15/024 119/706 |
| 3,159,141 | A | * | 12/1964 | Paterek | A01K 15/024 119/706 |
| 3,482,548 | A | * | 12/1969 | Burns | A01K 15/024 119/706 |
| 3,486,485 | A | * | 12/1969 | Kahanick | A01K 15/024 119/706 |
| 3,993,027 | A | * | 11/1976 | Mullin | A01K 15/024 119/706 |
| D254,813 | S | * | 4/1980 | Kossar | A01K 15/024 119/706 |
| D254,814 | S | * | 4/1980 | Kossar | A01K 15/024 119/706 |
| D254,815 | S | * | 4/1980 | Kossar | A01K 15/025 119/706 |
| 4,195,593 | A | * | 4/1980 | Dunn | A01K 1/033 119/499 |

(Continued)

FOREIGN PATENT DOCUMENTS

DE 1212772 B * 3/1966 .......... A01K 15/024
WO WO-2015033672 A1 * 3/2015

*Primary Examiner* — Magdalena Topolski
*Assistant Examiner* — Morgan T Barlow
(74) *Attorney, Agent, or Firm* — Gugliotta & Gugliotta LPA (57) ABSTRACT

A claw scratcher system is provided having a block of corrugated cardboard material contained within a packaging housing. The packaging housing is formed having a containment bottom hingedly connected to a folding front face. The front face pivots from a first position, where it covers and contains the corrugated cardboard material, and rotates to the rear. The front face further has an extension leg 100 formed therein such that the housing has a dual functionality in forming an angular extension mechanism for presenting the scratcher in an inclined condition.

9 Claims, 6 Drawing Sheets

(56) References Cited

U.S. PATENT DOCUMENTS

| | | | | |
|---|---|---|---|---|
| 4,787,335 A * | 11/1988 | Carlyon | A01K 1/0107 119/170 |
| 4,996,946 A * | 3/1991 | Olson | A01K 15/024 119/706 |
| 5,038,716 A * | 8/1991 | Olson | A01K 15/024 119/706 |
| 5,592,901 A * | 1/1997 | Birmingham | A01K 15/024 119/706 |
| 5,752,470 A * | 5/1998 | Koneke | A01K 1/0125 119/499 |
| 5,797,353 A * | 8/1998 | Leopold | A01K 15/025 119/710 |
| D440,717 S * | 4/2001 | Fazio | A01K 1/0613 119/706 |
| 6,367,423 B1 * | 4/2002 | Scheuer | A01K 1/035 119/706 |
| 8,561,575 B2 * | 10/2013 | Ruffin | A01K 15/024 119/706 |
| 2001/0045191 A1 * | 11/2001 | Gear | A01K 15/024 119/706 |
| 2004/0139926 A1 * | 7/2004 | Diep | A01K 15/024 119/601 |
| 2005/0039695 A1 * | 2/2005 | Deming, Jr. | A01K 15/024 119/706 |
| 2005/0170040 A1 * | 8/2005 | Moulton | A01K 15/026 426/1 |
| 2006/0137623 A1 * | 6/2006 | Lamstein | A01K 15/024 119/706 |
| 2007/0028852 A1 * | 2/2007 | Ciciora | A01K 15/025 119/709 |
| 2007/0074675 A1 * | 4/2007 | Tu | A01K 15/024 119/706 |
| 2008/0196675 A1 * | 8/2008 | Murrer | A01K 1/033 119/706 |
| 2009/0188439 A1 * | 7/2009 | Simpson | A01K 15/024 119/706 |
| 2010/0006037 A1 * | 1/2010 | Salzman | A01K 1/033 119/484 |
| 2010/0122665 A1 * | 5/2010 | Delzio | A01K 15/024 119/706 |
| 2013/0206079 A1 * | 8/2013 | Lipscomb | A01K 15/024 119/706 |
| 2014/0014043 A1 * | 1/2014 | McCann | A01K 15/024 119/706 |
| 2014/0318467 A1 * | 10/2014 | Jette, Jr. | A01K 1/0613 119/416 |
| 2015/0017118 A1 * | 1/2015 | Tsengas | A01K 15/025 424/84 |
| 2016/0338320 A1 * | 11/2016 | Floyd | A01K 15/024 |
| 2017/0137206 A1 * | 5/2017 | Ting | B65D 81/368 |
| 2017/0265433 A1 * | 9/2017 | Davila | A01K 15/024 |
| 2018/0206451 A1 * | 7/2018 | Rogers | A01K 15/024 |
| 2018/0352785 A1 * | 12/2018 | Chia | A01K 15/024 |

* cited by examiner

STAND UP FOLD AWAY CLAW SCRATCHER

RELATED APPLICATIONS

The present application claims benefit of U.S. Provisional Patent 62/168,690, filed on May 19, 2015 and is a Continuation Application of Ser. No. 15/156591, both of which are incorporated by reference as if fully rewritten herein.

BACKGROUND OF THE INVENTION

1. Field of the Invention

The present invention relates generally to apparatuses, systems and methods for dulling animal claws and, more particularly, to such an apparatus, system and method that can be dispensed from a flat storage configuration to a generally vertical use configuration.

2. Description of the Related Art

Domestic cats have a natural instinct to scratch. What appears to be a method of grooming their claw, scratching is instinctive character. If a dedicated scratching surface is not provided, domestic cats will generally satisfy their need to scratch by turning to furniture, curtains and other articles which can be substantially damaged as a consequence. Such destructive behavior can included climbing over furniture (especially upholstered chairs and sofas) such that the furniture and carpeting are used to condition their claws through deliberate and repeated clawing, pulling and tearing.

To accommodate this need in a less destructive manner, dedicated scratching posts and surfaces are available. These devices are a sacrificial surface, and are disposed of and replaced once destroyed.

A common scratching appliance that has become commercially available and effective is a block of corrugate cardboard laminate material in which layers of corrugate cardboard are formed into a block in which the open ends of the corrugate thereby form the scratching surface. Such a product is currently provided in three variations:

- as a long, narrow block under the name OurPets® Straight and Narrow Single Wide Reversible Cat Scratcher;
- as a double wide block under the name OurPets® Far and Wide Scratcher; and
- as long, medium width block under the name OurPets® Alpine Cat Scratcher.

The first two version are provided nested within a boxed frame. The third version is provided in a boxed frame that in inclined, allowing for the cat to utilize the scratching element while climbing up the inclined ramp. With the Alpine Cat Scratcher, being able to provide for a generally upright scratching surface attracts the interest of certain domestic cats. However, such an inclined design is fixed and does not allow for variability, which pets desire.

Consequently, a need exists to provide a corrugate scratcher apparatus, system and method that can be dispensed from a flat storage configuration to a use configuration that can be adjustable to various upward orientations.

SUMMARY OF THE INVENTION

It is therefore an object of the present invention to provide an improved apparatus, system and method for dulling animal claws.

It is a feature of the present invention to provide an improved apparatus, system and method for dulling animal claws that can be dispensed from a flat storage configuration to a use configuration that can be adjustable to various upward orientations.

According to an aspect of the present invention, a claw scratcher system is provided in which a block of corrugated cardboard material is utilized. The block of corrugated cardboard material is formed in a generally rectangular body having a front face that is presented for access to a cat for scratching, with a rear face provided with a planar cover attached to a portion thereof. The cover is shaped to cover both the rear face and front face, and extends from an attached portion to fold contiguously over the rear face and extends over the front face, thereby forming an extended "flap" to cover the block of corrugated cardboard material front and back in a manner similar to that of a book cover. In such a orientation the cover may be opened and the scratcher may be presented flat on the ground. Alternately, the extended flap includes at least one impingement tab upon which the corrugated cardboard material may be propped up angularly, thereby presenting the scratcher at an inclined or generally vertical orientation.

According to another aspect of the present invention, a claw scratcher system is provided in which two separate scratcher surfaces are hingedly connected along an apex. The scratcher surfaces may be of a block of corrugated cardboard material, but may also include materials of different tactile roughness, including carpet, sisal, jute, sea grass or other similar surface covering. Connecting the bases of the two separate scratcher surfaces is a strap, string, or other compressible/extendible tethering to allow the surfaces to be extended at the base and about the apex such as to form a self supporting pyramidal structure for presentation of the surfaces for availability to felines. Such a connecting base may further be contracted to allow the scratcher system to be folded flat for storage, shipping, merchandising, etc.

According to yet another aspect of the present invention, a block of corrugated cardboard material is formed in a generally rectangular body having a front face that includes materials of at least two different tactile roughness. The surface may include segments of corrugated cardboard material, as well as at least one portion including carpet, sisal, jute, sea grass or other similar surface covering. Such a multi-tactile surface configuration provide additional feline interest during scratching, and may be provided merely as an improvement to any of the three variations of scratching systems already available, or may alternately be provided in conjunction with any of the other aspects of the present invention described above herein. According to yet another aspect of the present invention, a scratcher block may be further provided in combination with a hook and loop fastener system in which a rear surface of the scratcher block supports a loop fastener element and a hook fastener element is provided in combination for attachment to a vertical surface such as a door, wall or similar structure. Such a combination allows a user to mount the scratcher block in an upright orientation for presentation to the cat, or alternately presenting horizontally in a manner similar to existing systems. A further feature of such an invention aspect includes the loop fastener material being capable of providing an alternate tactile surface for scratching when not utilized to attach to the hook fastener element.

An advantage of the present invention is that an inexpensive, disposable cardboard scratcher can be provided that may be presented in various orientations such as to cause the target animal to prefer the dedicated scratcher over other objects whose destruction is not preferred.

These and further objects will be more readily apparent when considering the following disclosure and appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
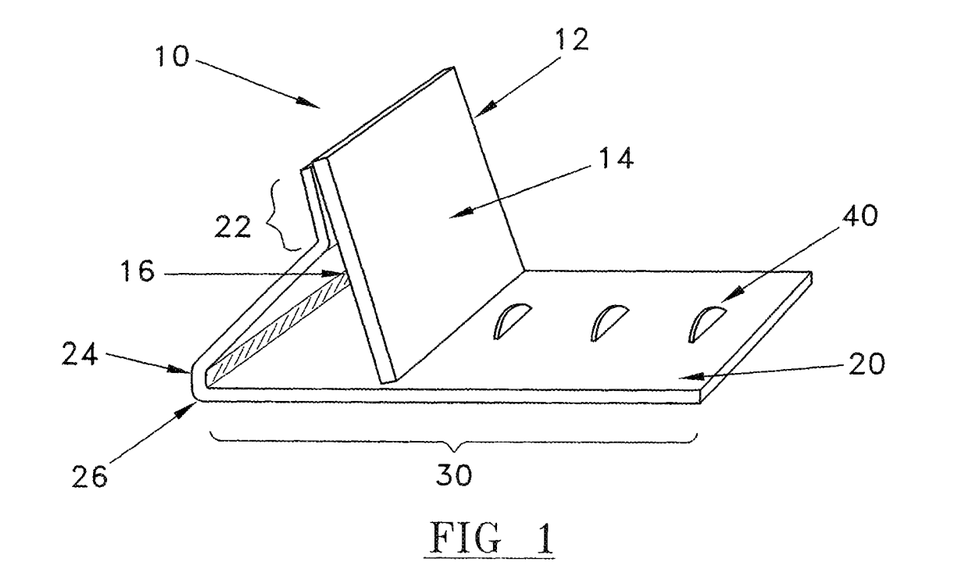
FIG. 1 is a perspective view of a cat claw scratcher system according to a first preferred embodiment of the present invention.
Figure 2:
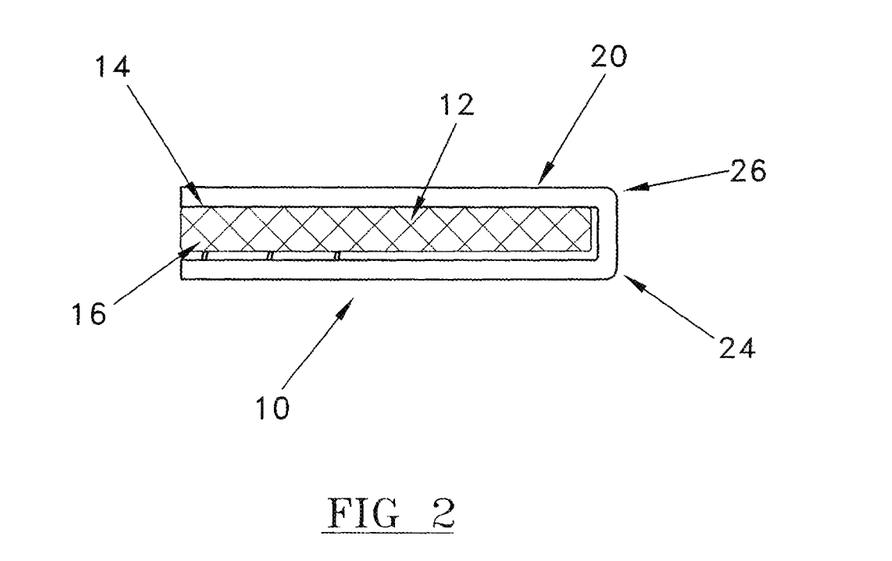
FIG. 2 is a side elevational view thereof.

Referring now to FIG. 1-2, a claw scratcher system, generally noted as 10, is shown according to a preferred embodiment of the present invention in which a block of corrugated cardboard material 12 is utilized as a claw scratching body. It is anticipated that in the preferred embodiments of the present invention the use of strips of corrugated material, or corrugated strips as a foundation material to be configured in layers to form a block, or bulk shape as shown in the figures. The block of corrugated cardboard material 12 is formed in a generally rectangular body having a front face 14 that is presented for access to a cat for scratching, with a rear face 16 provided with a planar cover 20 attached to an portion 22 of the rear face 16. Attachment may be accomplished by glue or other appropriate adhesive, but such an attachment mechanism is not intended to be limiting. As should be obvious to one having ordinary skill in the relevant art, in light of the present teachings, the use of other attachment mechanism, including, inter alia, double sided tape, hook and loop fasteners, mechanical impingement, mechanical fasteners or the like would also adequately suffice. The cover 20 is shaped to cover both the rear face 16 and front face 14, and extends from the attached portion 22 to a first to crease, seam or fold 24, and a second crease, seam or fold 26, and then contiguously over the rear face 16 and extends over the front face 18. A distance "D" between the first and second folds 24/26 should accommodate the width of the scratching block 12. The cover 20 thereafter forms an extended "flap" 30 to cover the block of corrugated cardboard material front and back in a manner similar to that of a book cover. In such a orientation the cover may be opened and the scratcher may be presented flat on the ground. Alternately, the extended flap 30 includes at least one impingement tab 40 upon which the corrugated cardboard material 12 may be propped up angularly, thereby presenting the scratcher at an inclined or generally vertical orientation. The cover 20 itself has a significant surface area that further provides an area for imparting use instructions, merchandising information or other graphical or text content that may be useful to either the product provider or product user.

Figure 3:
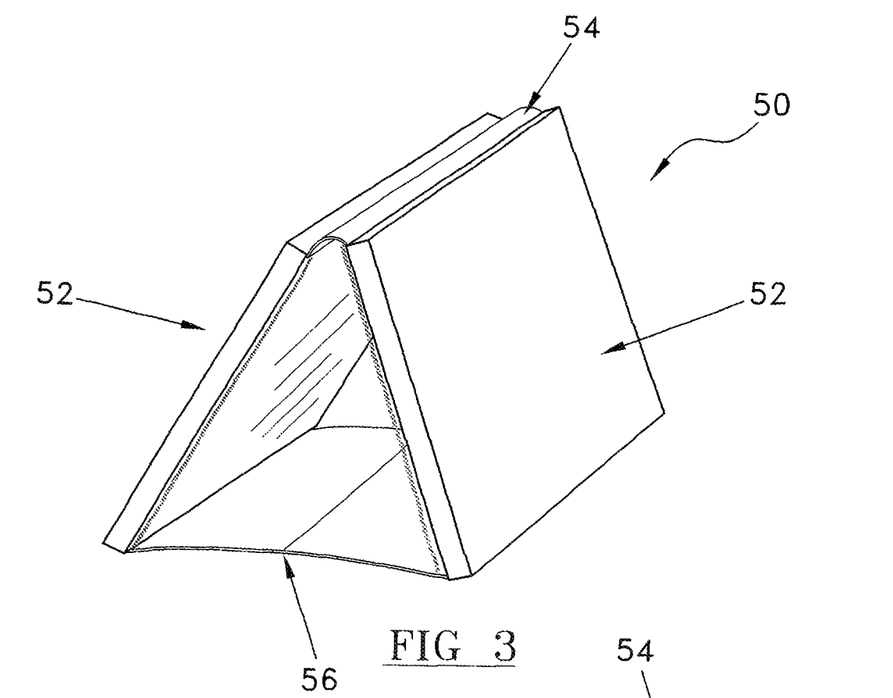
FIG. 3 is a perspective view of a cat claw scratcher system according to a second preferred embodiment of the present invention.
Figure 4:
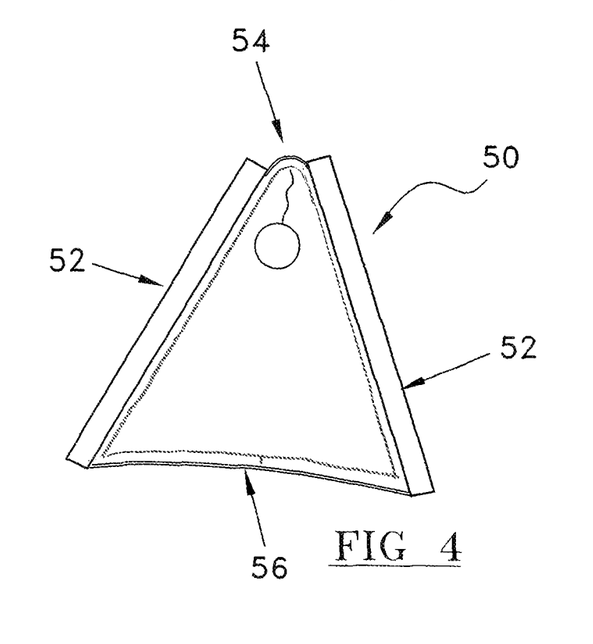
FIG. 4 is a side elevational view thereof shown in an open, deployed orientation.
Figure 5:
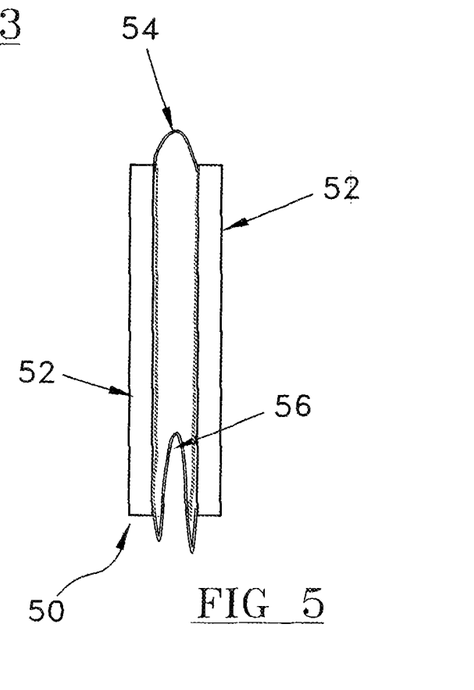
FIG. 5 is a side elevation view thereof shown in a closed orientation.

Referring now to FIG. 3-5, a claw scratcher system, generally noted as 50, is provided according to a second preferred embodiment in which two separate scratcher surfaces 52 are hingedly connected along an apex 54. The scratcher surfaces 52 may be of a block of corrugated cardboard material, but may also include materials of different tactile roughness, including carpet, sisal, jute, sea grass or other similar surface covering. Connecting the bases of the two separate scratcher surfaces 52 is a strap, string, or other compressible/extendible tethering 56 to allow the surfaces to be extended at the base and about the apex 54 such as to form a self supporting pyramidal structure for presentation of the surfaces for availability to felines. As shown best in conjunction with FIG. 5, such a connecting base 56 may further be contracted to allow the scratcher system to be folded flat for storage, shipping, merchandising, etc.

Figure 6:
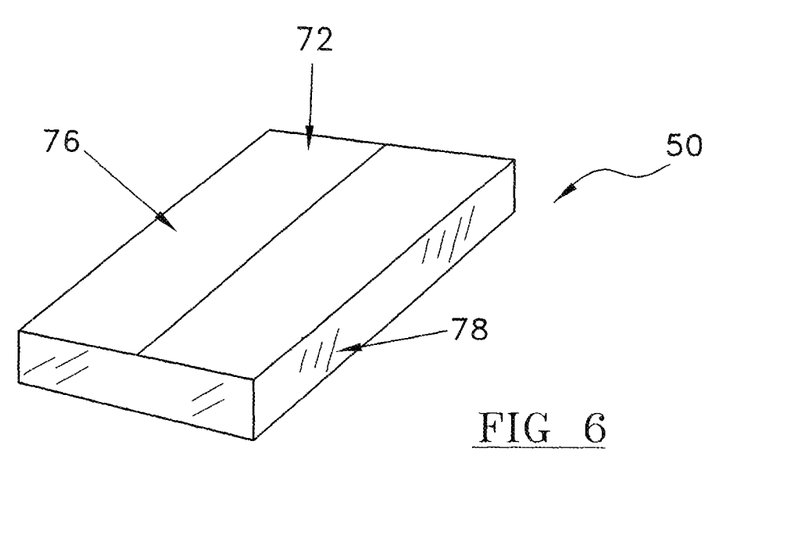
FIG. 6 is a perspective view of a cat claw scratcher according to a third preferred embodiment of the present invention.
Figure 7A:
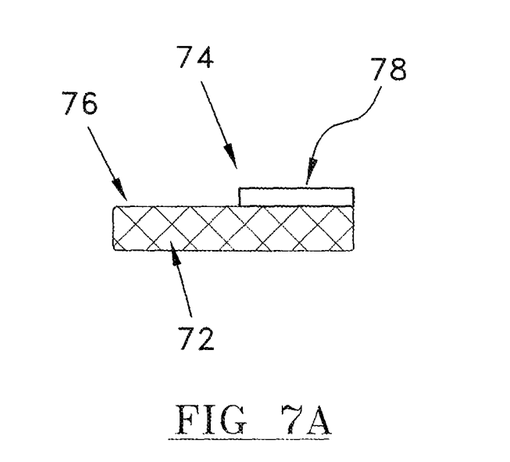
FIG. 7A is a side elevational view thereof according to a first variant.
Figure 7B:
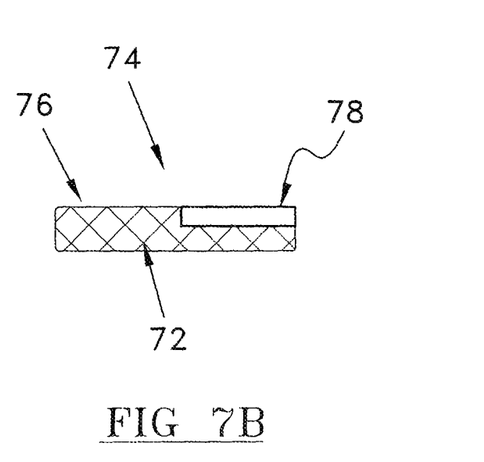
FIG. 7B is a side elevational view thereof according to a first variant.
Figure 8:
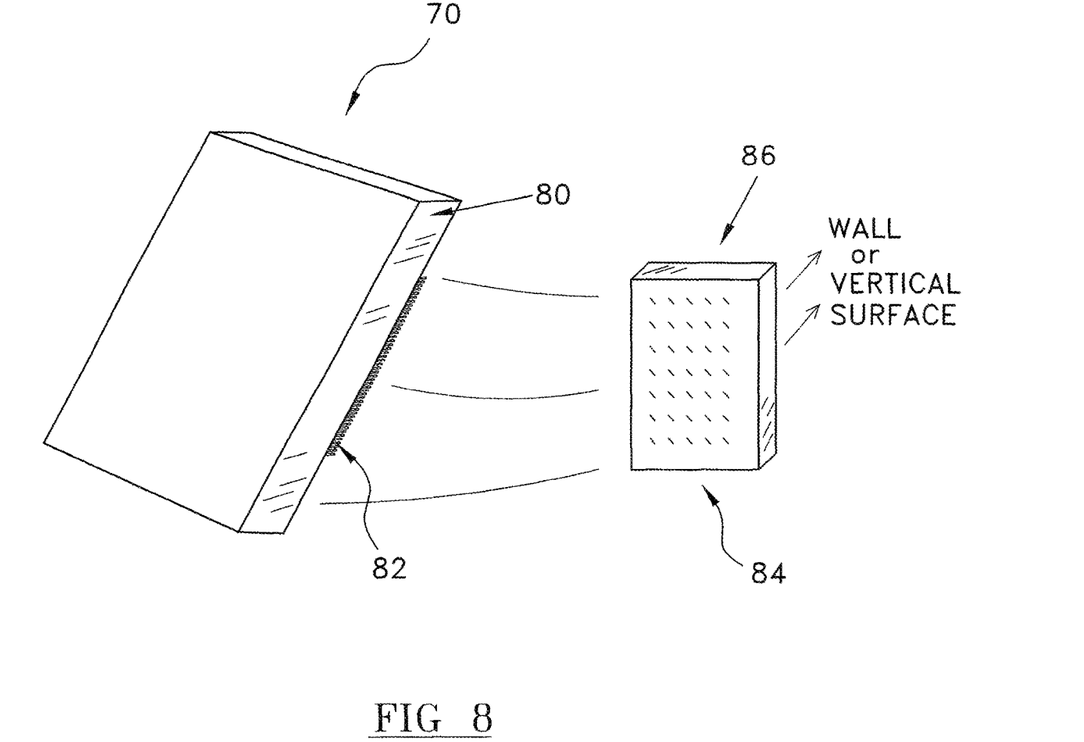
FIG. 8 is a partial exploded view thereof shown in combination with a hook and loop fastener for upright surface attachment.

Referring now to FIG. 6-8, a claw scratcher system, generally noted as 70, is shown according to yet another aspect of the present invention. A block of corrugated cardboard material 72 is formed in a generally rectangular body having a front face 74 that includes materials of at least two different tactile roughness 76, 78. The surface may include segments of corrugated cardboard material 76, as well as at least one portion 78 including carpet, sisal, jute, sea grass or other similar surface covering. Referring now in conjunction with FIG. 8, a scratcher block 70 may be further provided in combination with a hook and loop fastener system in which a rear surface 80 of the scratcher block 72 supports a loop fastener element 82 and a hook fastener element 84 with an adhesive rear surface 86 is provided in combination for attachment to a vertical surface such as a door, wall or similar structure. Such a combination allows a user to mount the scratcher block 70 in an upright orientation for presentation to the cat, or alternately presenting horizontally in a manner similar to existing systems. A further feature of such an embodiment includes the loop fastener material 82 being capable of providing an alternate tactile surface for scratching when not utilized to attach to the hook fastener element.

Figures 9, 10A:
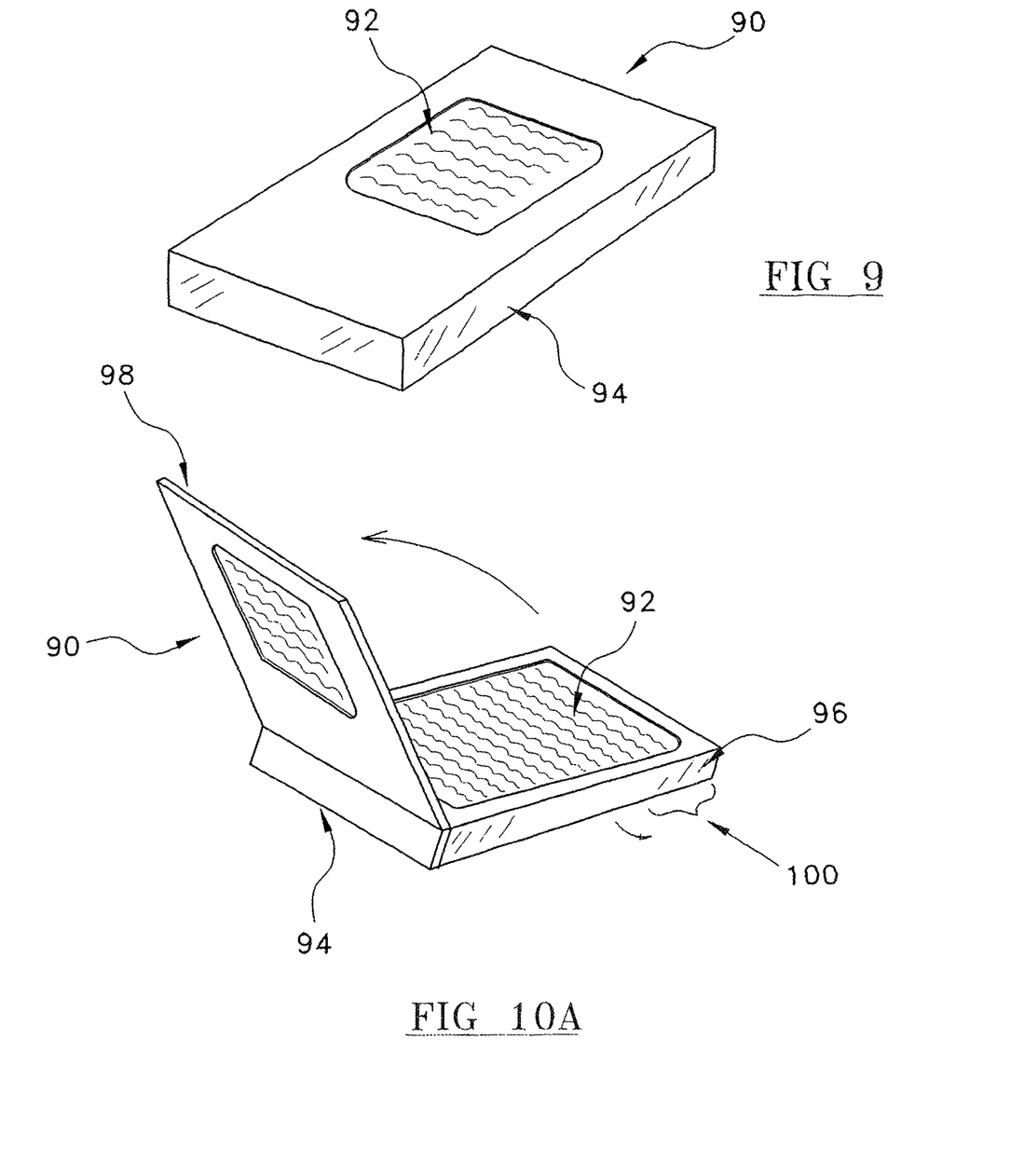
FIG. 9 is a perspective view of a cat claw scratcher according to a fourth preferred embodiment of the present invention.
FIG. 10a is a perspective view of the cat claw scratcher of FIG. 9 shown in the process of deployment.
Figure 10B:
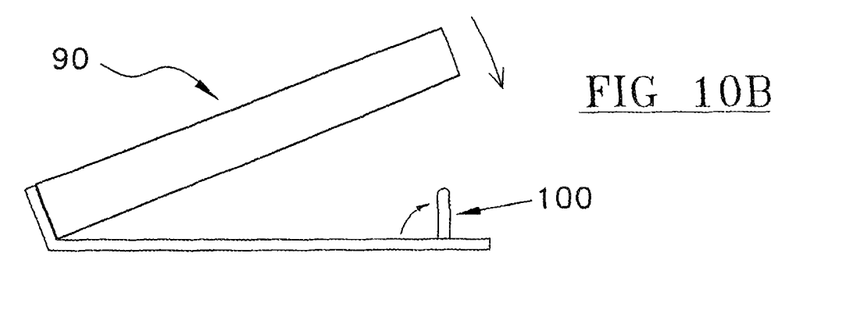
FIG. 10b is a side elevational view of the cat claw scratcher of FIG. 9 shown in the process if deployment.
Figure 11:
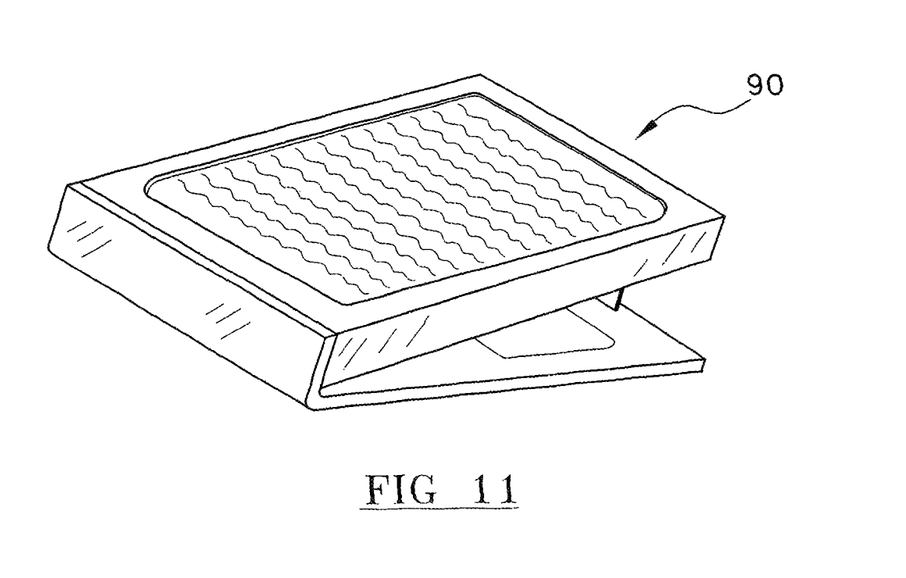
FIG. 11 is a perspective view of the cat claw scratcher according to the fourth preferred embodiment in a deployed condition.

Referring now to FIG. 9-11, a claw scratcher system, generally noted as 90, is shown according to yet another aspect of the present invention. A block of corrugated cardboard material 92 is formed in a generally rectangular body and contained within a packaging housing 94. The packaging housing 94 is formed having a containment bottom 96 hingedly connected to a folding front face 98. The front face 98 may pivot from a first position, shown in FIG.

9, where it covers and contains the corrugated cardboard material 92, and rotates to the rear as shown best in FIG. 10*a* and FIG. 10*b*. The front face 98 further has an extension leg 100 formed therein. As shown best in conjunction with FIG. 11, when the system 90 is deployed, the housing 94 has a dual functionality in forming an angular extension mechanism for presenting the scratcher in an inclined condition.

The above claw scratcher systems may, in addition to providing the ability to be dispensed from a flat storage configuration to a generally vertical use configuration, also allow for the inclusion of various other improvements already known and desired within the art. These can include the incorporation of an attractant material such as, for example, catnip, to be sprinkled into vertical channels of such corrugated bundles.

In light of and in hindsight with the present teachings and disclosures, it may become obvious to a person having ordinary skill in the relevant art that the incorporation of an enhanced surface in which a tackified surface incorporates a sprayed, poured or dipped liquid material or a flaked, powdered or otherwise bulk attractant material can be combined in other combinations and permutations in conjunction with a corrugated cardboard structure. These can include variations in the block or volumetric structure of the block, as well as integration of the attractant onto liners walls, flute sheets or even other structures formed within, between or beneath the corrugated bundles or the vertical channels. Such variations and combination are considered to be obvious equivalents of the present invention.

2. Operation of the Preferred Embodiment

In operation, when a cat claws the corrugated bundle of the corrugated assembly, its claws will extend through the vertical channels or tear through at least a portion of the rippled sheet or liner walls and contacting the various surfaces and thereby simultaneously trimming or dulling the cat's claws. This trimming or dulling is enhanced by the encouragement provided by the attractant, such as, for example, catnip, that encourages greater interaction and continued interest. The more the cat scratches and contacts the various surfaces, the greater the release of catnip or other attractant which continues to engage the cat in such activity.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by the following exemplary claims nor by any possible, adverse inference under the rulings of *Warner-Jenkinson Company*, v. *Hilton Davis Chemical*, 520 US 17 (1997) or *Festo Corp.* V. *Shoketsu Kinzoku Kogyo Kabushiki Co.*, 535 U.S. 722(2002), or other similar caselaw or subsequent precedent should not be made if such claims are amended subsequent to this Patent Application.

Having thus described the invention what is claimed as new and desired to be secured by Letters Patent is as follows:

1. A claw scratcher system comprising:
   a block of corrugated cardboard material formed in a generally geometric body and contained within a packaging housing;
   said packaging housing having a containment bottom hingedly connected to a folding front face, said front face pivoting from a first position where it covers and contains the corrugated cardboard material and rotates to a second position at a housing rear; and
   an extension leg formed extending from a front of the front face to form an angular extension mechanism for presenting the block of corrugated cardboard material in an inclined condition.

2. The claw scratcher system of claim 1, wherein said containment bottom hingedly connected to the folding front face allows for dispensing from a flat storage configuration to a generally vertical use configuration.

3. The claw scratcher system of claim 2, wherein said block of corrugated cardboard material further incorporates an attractant material.

4. The claw scratcher system of claim 3, wherein said attractant material comprises catnip placed into liners, walls, flute sheets, or within, between or beneath corrugated bundles or linear channels of the corrugated cardboard material.

5. The claw scratcher system of claim 3, wherein said attractant material is adhered to a tackified surface formed on the corrugated cardboard material by a sprayed, poured or dipped liquid material.

6. The claw scratcher system of claim 3, wherein said generally geometric body is a rectangular prism.

7. The claw scratcher system of claim 1, wherein said block of corrugated cardboard material further incorporates an attractant material.

8. The claw scratcher system of claim 7, wherein said attractant material comprises catnip placed into liners, walls, flute sheets, or within, between or beneath corrugated bundles or linear channels of the corrugated cardboard material.

9. The claw scratcher system of claim 7, wherein said attractant material is adhered to a tackified surface formed on the corrugated cardboard material by a sprayed, poured or dipped liquid material.

\* \* \* \* \*